(12) United States Patent
Collins

(10) Patent No.: US 10,296,633 B1
(45) Date of Patent: May 21, 2019

(54) DATA STORAGE MANAGEMENT SYSTEM

(71) Applicant: Amazon Technologies, Inc., Seattle, WA (US)

(72) Inventor: Jonathan Robert Collins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 436 days.

(21) Appl. No.: 15/078,875

(22) Filed: Mar. 23, 2016

(51) Int. Cl.
*G06F 17/00* (2006.01)
*G06F 17/30* (2006.01)

(52) U.S. Cl.
CPC .............. *G06F 17/30581* (2013.01)

(58) Field of Classification Search
None
See application file for complete search history.

(56) References Cited

U.S. PATENT DOCUMENTS

| | | | |
|---|---|---|---|
| 7,403,658 B2 | 7/2008 | Lin et al. | |
| 7,877,258 B1* | 1/2011 | Chelba | G06F 17/2715 704/240 |
| 8,209,577 B2 | 6/2012 | Huang et al. | |
| 8,527,544 B1* | 9/2013 | Colgrove | G06F 3/0608 707/791 |
| 9,026,499 B1* | 5/2015 | Rajimwale | G06F 17/30893 707/674 |
| 9,110,880 B1* | 8/2015 | Strope | G10L 15/183 |
| 9,298,858 B1* | 3/2016 | Tomar | G06F 11/366 |
| 9,367,397 B1* | 6/2016 | Xie | G06F 11/1402 |
| 9,436,449 B1* | 9/2016 | Chandnani | G06F 17/30902 |
| 9,639,589 B1* | 5/2017 | Theimer | G06F 11/1461 |
| 2009/0222509 A1* | 9/2009 | King | G06F 17/30194 709/203 |
| 2010/0037056 A1 | 2/2010 | Follis et al. | |
| 2011/0071980 A1* | 3/2011 | Patterson | G06F 3/0611 707/626 |
| 2012/0016901 A1* | 1/2012 | Agarwal | G06F 17/30569 707/769 |
| 2012/0166487 A1 | 6/2012 | Stougie et al. | |

(Continued)

OTHER PUBLICATIONS

U.S. Appl. No. 14/133,575, filed Dec. 18, 2013, Bryan James Donlan.

(Continued)

*Primary Examiner* — Hung D Le
(74) *Attorney, Agent, or Firm* — Robert C. Kowert; Meyertons, Hood, Kivlin, Kowert & Goetzel, P.C.

(57) ABSTRACT

A system includes a storage system configured to store data objects as a plurality of shards according to a redundancy encoding technique at a plurality of availability zones. The system further includes a redundancy reduction manager configured to perform a shard spreading process and a shard pruning process. The shard spreading process involves identifying an underutilized availability zone for a particular data object and moving at least one shard of the particular data object from another availability zone to the underutilized availability zone. The shard pruning process involves identifying a pruning candidate availability zone and deleting a shard of a particular data object at the pruning candidate availability zone in response to determining that deleting the shard would not violate a durability model for the particular data object.

20 Claims, 6 Drawing Sheets

(56) References Cited

U.S. PATENT DOCUMENTS

| | | | | |
|---|---|---|---|---|
| 2013/0238570 | A1* | 9/2013 | Rao | G06F 17/30156 707/692 |
| 2014/0095817 | A1* | 4/2014 | Hsu | G06F 11/1438 711/162 |
| 2014/0195748 | A1* | 7/2014 | Bashyam | G06F 12/121 711/159 |
| 2014/0279920 | A1* | 9/2014 | Madhavarapu | G06F 17/30283 707/649 |
| 2016/0191509 | A1* | 6/2016 | Bestler | G06F 3/067 713/163 |
| 2016/0350392 | A1* | 12/2016 | Rice | G06F 17/30575 |
| 2016/0371294 | A1* | 12/2016 | Aronovich | G06F 17/30156 |

OTHER PUBLICATIONS

U.S. Appl. No. 14/543,827, filed Nov. 17, 2014, James Christopher Sorenson, et al.

U.S. Appl. No. 14/570,952, filed Dec. 15, 2014, Mark Robert Sieklucki, et al.

U.S. Appl. No. 14/589,916, filed Jan. 5, 2015, James Christopher Sorenson.

U.S. Appl. No. 14/589,919, filed Jan. 5, 2015, James Christopher Sorenson.

James S. Plank, "Optimizing Cauchy Reed-Solomon Codes for Fault-Tolerant Storage Applications", Technical Report CS-05-569, Department of Computer Science, Dec. 2005, pp. 1-12, University of Tennessee.

James S. Plank, et al., "Optimizing Cauchy Reed-Solomon Codes for Fault-Tolerant Network Storage Applications", The 5th IEEE International Symposium on Network Computing and Applications (IEEE NCA06), Jul. 2006, pp. 1-9.

John Kubiatowicz, et al., "OceanStore: An Architecture for Global-Scale Persistent Storage", In the Proceedings of the Ninth International Conference on Architectural Support for Programming Languages and Operating Systems (ASPLOS 2000), Nov. 2000, pp. 1-12.

Jay J. Wylie, et al., "Survivable Information Storage Systems", IEEE Computer Society, Aug. 2000, pp. 61-68.

Avinash Lakshman, et al., "Cassnadra—A Decentralized Structured Storage System", ACM SIGOPS Operating Systems Review, 2010, pp. 35-40.

Rodrigo Rodrigues, et al., "High Availability in DHTs: Erasure Coding vs Replication", In Peer-to-Peer Systems IV, Feb. 24, 2005, pp. 226-239.

* cited by examiner

DATA STORAGE MANAGEMENT SYSTEM

BACKGROUND

Modern computing applications require storage of large amounts of data. Over time, the need to store and retrieve large amounts of data continues to increase. Other common concerns are the ability to store data durably and efficiently. Durability typically refers to the ability to recover data in the event of a failure. Data durability typically requires some form of redundancy in how the data is stored. For example, data may be mirrored to two different storage devices such that an exact replica copy of the data is stored on both storage devices. If one of the storage devices fails, the data can still be retrieved from the other storage device. Some systems desire even stronger levels of durability that involve more complex redundancy encoding schemes that allow the data to still be retrieved even after multiple device failures. Techniques to provide data durability typically incur some amount of overhead, both in terms of the amount of additional storage required and computational overhead, and thus are at odds with the desire to be able to store and retrieve large amounts of data efficiently.

Web-based applications, cloud computing, and other network and Internet based technologies are area frequently requiring storage of large amounts of data with needs for durability and efficiency. The conventional Web model allows clients to access Web resources (e.g., applications, services and data) via an HTTP client program, such as a Web browser. A technology referred to as Web services has been developed to provide programmatic access to Web resources. Web services may be used to provide programmatic access to Web resources including technology platforms (e.g., applications and services) and data (e.g., product catalogs and other databases) hosted on Web-connected computers such as Web server systems via a Web service interface. Generally speaking, a Web service interface may be configured to provide a standard, cross-platform API (Application Programming Interface) for communication between a client requesting some service to be performed and the service provider. In some implementations, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

One example of a service that is provided to clients via a Web service interface is a data storage service. A typical data storage service (which may be referred to herein as an "object-redundant storage system") may receive requests to store data objects on behalf of storage service clients, and may store those data objects using redundancy in order to provide a high level of durability for the stored data. For example, such a data storage service may replicate the objects it stores across different storage nodes to increase the likelihood that object data will survive the failure of any given storage node. In such systems, until a certain minimum number of replicas (e.g., two or three) of an object have been successfully written the write operation may not be considered to be completed. However, for a given object, the actual number of valid replicas (or instances) of that object might at some points in time be less than the target number, for a variety of reasons, and a replacement process may be invoked to correct the situation. For example, if a previously valid replica becomes inaccessible due to a failure of the device on which it was stored, the failed device may be replaced in the system, and another instance of the replica may be written to the replacement device. In some systems, each replica need not correspond to an exact copy of the object data. For example, in some object-redundant storage systems, an object may be divided into a number of portions or "shards" according to a redundant encoding scheme (such as a parity, error correction code or other scheme), such that the object data may be recreated from fewer than all of the generated portions. Typically, object-redundant storage systems may be also seek to improve performance characteristics, such as latency, throughput, availability, or storage efficiency.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may manage how data objects are stored by a provider network (e.g., a storage service). The data objects may be coded into a plurality of "shards" according to a redundancy encoding technique. At a future time, some or all of the shards may be used to reconstruct the original data object according to the redundancy encoding technique. Additionally, for durability and availability, provider networks may distribute shards (and associated computing systems, nodes, servers or other devices) across different availability zones. An availability zone may be a fault tolerant zone that may continue to operate despite an infrastructure failure of another availability zone in the provider network. Availability zones may be geographically diverse, in some embodiments. For instance, one or more data centers that may implement a particular availability zone may be located in a different geographic location (e.g., different building, city, county, state, country, or continent). In other embodiments, availability zones may be geographically local (e.g., same building) but may use different hardware (e.g., a different power source, networking infrastructure, and computing hardware).

A number (e.g., a quantity) of shards generated according to the redundancy encoding technique may be based on a durability model for the data object. Additionally, the shards may be stored on various storage devices located within various availability zones of the storage service according to the durability model. In other words, the durability model may specify a redundancy requirement for the data object that accounts for an availability zone-wide failure. For example, the durability model may specify that the shards should be stored such that if all shards in any one availability zone are lost (e.g., due to an infrastructure failure condition at the availability zone), at least a particular number of shards should still be available (e.g., a number of shards greater than or equal to a number of shards needed to reconstruct the data object).

As described above, the redundant shards may consume an undesirable amount of storage resources (e.g., storage space, power, etc.) of the storage service. An amount of storage resources used to store a data object may be reduced by re-encoding the data object into a different number of shards (e.g., according to a more efficient redundancy encoding technique when the more efficient redundancy encoding technique is implemented). However, in some cases, re-encoding data objects into a different number of shards may be computationally intensive.

In some embodiments, the amount of storage resources used to store the data object may be reduced by spreading the shards amongst a larger number of availability zones. In particular, as described further below, in cases where a durability model specifies a particular number of shards that should still be available if all shards in an availability zone are lost, a system that spreads the shards amongst a larger number of availability zones may comply with the durability model while storing fewer shards, as compared to a system that stores the shards at a smaller number of availability zones. Accordingly, in some cases, resources of the storage service may be reduced without violating the durability model by an iterative process of spreading shards to different availability zones and deleting shards.

Figure 1:
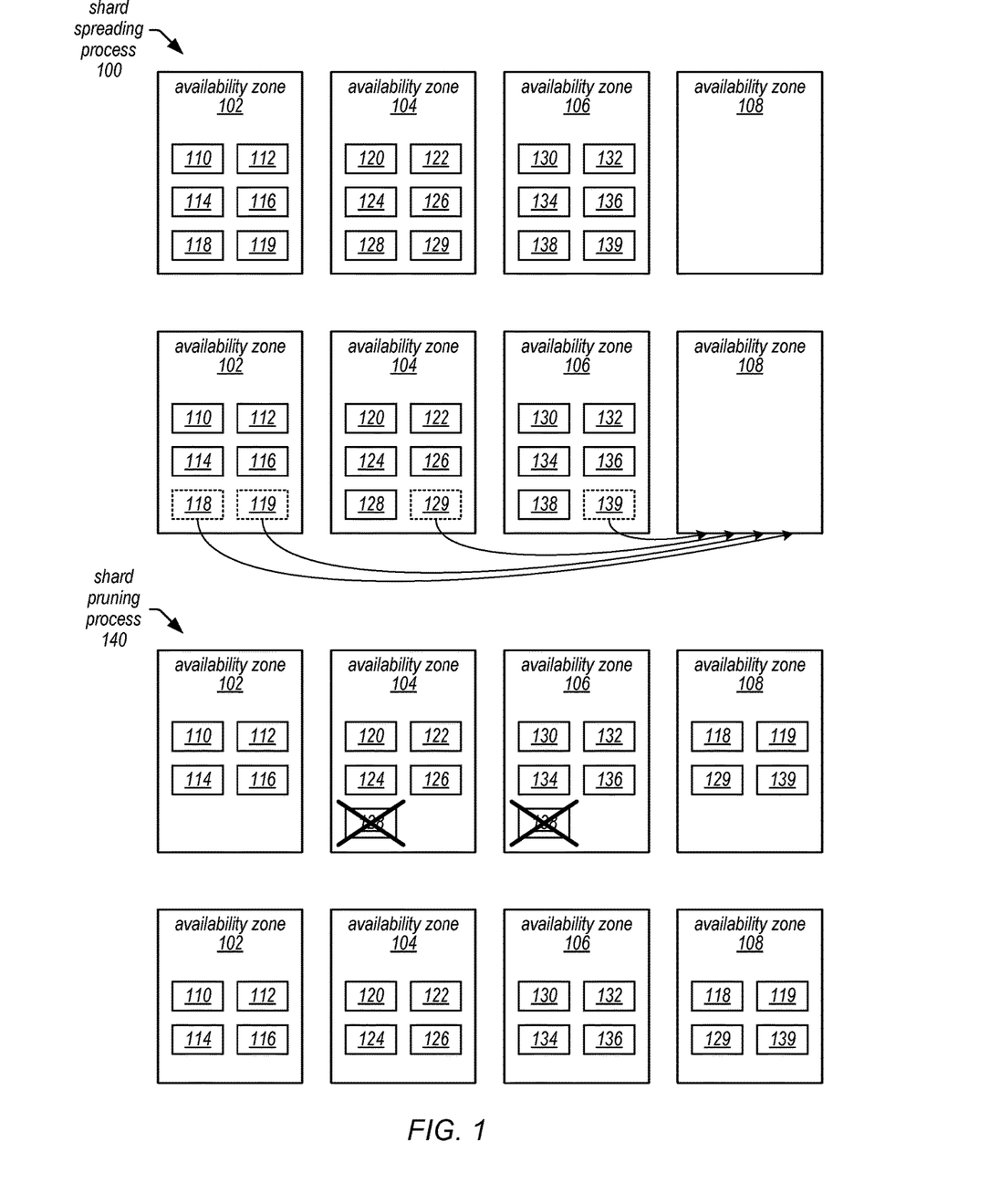
FIG. 1 is a block diagram illustrating an example system that spreads and prunes shards of a data object stored at various availability zones.

FIG. 1 is a block diagram illustrating an example system that spreads and prunes shards of a data object stored at various availability zones. In this example, the system includes availability zones 102-108 and shards 110-139 of a particular data object. As described below with reference to FIG. 2, in some embodiments, the system of FIG. 1 is part of a network-based service. However, in other embodiments, the system of FIG. 1 is part of a closed network. Although specific numbers of shards and availability zones are illustrated in the embodiment of FIG. 1, in other embodiments, other numbers of shards, other numbers of availability zones and shards may instead be used. Although the durability model described with regard to FIG. 1 results in an even distribution of shards between the availability zones, in other embodiments, different durability models may result in various uneven distributions of shards. For example, the durability model may specify that at least one availability zone store a sufficient number of shards to reconstruct a data object without using shards of other availability zones.

The availability zones 102-108 may correspond to groups of electronic devices that share infrastructure (e.g., a same power source, network infrastructure, etc.). Additionally, the electronic devices of one availability zone may have an infrastructure independence from a different availability zone such that a failure of the infrastructure of the different availability zone does not cause the electronic devices to fail. For example, in the illustrated embodiment, the electronic devices of the availability zone 102 have an infrastructure independence from the availability zone 104 such that a failure of infrastructure in the availability zone 104 does not cause the electronic devices of the availability zone 102 to fail. One example of a kind of electronic device that may fail as a result of an infrastructure failure is a storage device. In some cases, a failure of a storage device corresponds to a loss of data stored at the storage device. In other cases, a failure of a storage device corresponds to the data stored at the storage device being unavailable (e.g., to a client requesting reconstruction of the data object).

The shards 110-139 may be generated and stored according to a durability model. As noted above, fewer than all of the shards may be needed to reconstruct the data object. For example, in the illustrated embodiment, the data object may be reconstructed using any 10 of the shards 110-139. The durability model may specify a minimum quantity of redundancy of the data object to be stored by the system. For example, in the illustrated embodiment, the durability model specifies that the system must be able to reconstruct the data object even if one availability zone and up to two other storage devices outside of the one availability zone fail. Accordingly, in some cases, a number of shards of the data object may be generated based on the durability model, a number of availability zones originally selected to store shards of the data object, and a number of shards needed to reconstruct the data object. In the illustrated embodiment, 18 shards are originally generated and stored at availability zones 102, 104, and 106.

As discussed above, spreading shards to additional availability zones and pruning excess shards may enable the system to more efficiently store shards without re-encoding the shards into a smaller number of shards (e.g., according to a different redundancy encoding technique or the same redundancy encoding technique). In the illustrated embodiment, shard spreading process 100 is performed to move shards 118, 119, 129, and 139 to availability zone 108 (e.g., a newly added availability zone or an availability zone that the data object is newly authorized to use to store shards). Shard spreading process 100 includes identifying an underutilized availability zone (e.g., an availability zone that does not include any shards of the data object, such as availability zone 108) that is available to store shards of the data object and stores at least two fewer shards of the data object than another availability zone (e.g., availability zones 102, 104 and 106). In response to identifying the underutilized availability zone, at least one shard (e.g., shards 118, 119, 129, and 139) are moved to the underutilized availability zone (e.g., availability zone 108). In some embodiments, the underutilized availability zone is identified in response to an indication of a particular availability zone that does not include shards of the data object (e.g., because the particular availability zone is new or because the shard spreading process 100 was not authorized to store shards at the particular availability zone previously) and is available to store one or more shards of the data object, wherein the particular availability zone is identified as the underutilized availability zone.

As noted above, in the illustrated embodiment, the durability model specifies that the system must be able to reconstruct the data object even if one availability zone and up to two other storage devices outside of the one availability zone fail. However, after the shard spreading process 100, because each availability zone that stores shards of the data object stores fewer shards, the storage system may be able to delete at least some of the shards of the data object without violating the durability model. In the illustrated embodiment, shard pruning process 140 is performed to delete at least some shards from the system, thus saving storage resources dedicated to the data object. Shard pruning process 140 may identify a number of respective shards of the data object stored at each of the availability zones 102-108. Shard pruning process 140 may additionally identify a pruning candidate availability zone. Shard pruning process 140 may determine whether deleting a shard of the data object from the pruning candidate availability zone would violate the durability model. In response to determining that deleting the shard from the pruning candidate availability zone would not violate the durability model, the shard pruning process 140 may delete a particular shard from the pruning candidate availability zone.

For example, in the illustrated embodiment, after the shard spreading process 100, the shard pruning process 140 determines that the availability zones 102 and 108 store four shards of the data object and the availability zones 104 and 106 store five shards of the data object. The shard pruning process 140 may select the availability zone 104 as a pruning candidate. The shard pruning process 140 may determine that if an availability zone other than the pruning candidate availability zone (e.g., one of the availability zones 102, 106 or 108) were to fail, the system would still have either 11 or 12 shards available, more than the 10 needed to reconstruct the data object. Accordingly, the shard pruning process 140 may delete the shard 128. In the illustrated embodiment, the shard pruning process 140 performs a similar process with regard to the availability zone 106.

Accordingly, as a result of the shard spreading process 100 and the shard pruning process 140, the storage system stores 16 shards, as compared to the 18 shards stored prior to the shard spreading process 100 and the shard pruning process 140. In various embodiments, the shard spreading process 100 and the shard pruning process 140 may be performed iteratively (e.g., because the shard spreading process 100 may create new pruning opportunities for the shard pruning process 140). In some embodiments, the shard spreading process 100 and the shard pruning process 140 may be synchronized (e.g., by a redundancy reduction manager). For example, one process may not operate on the shards 110-139 while the other process is operating on the shards 110-139. Alternatively, the shard spreading process 100 and the shard pruning process 140 may not be synchronized. For example, the shard spreading process 100 and the shard pruning process 140 may not communicate regarding the shards 110-139. In some cases, the shard spreading process 100 may be unaware of the shard pruning process 140 and vice versa.

The shard spreading process 100 may select the one or more shards to move to the underutilized availability zone in various ways. In some embodiments, the redundancy encoding technique generates "identity shards" that, when combined, provide the data object (e.g., without a decoding operation). In some embodiments, the shard spreading process 100 may prioritize spreading non-identity shards over spreading identity shards. As result, a small number of availability zones may store the identity shards, increasing data object reconstruction throughput in some cases (e.g., situations where the availability zones storing the identity shards are selected to provide the shards for reconstructing the data object). Alternatively, in other embodiments, the shard spreading process 100 may prioritize spreading identity shards over spreading non-identity shards. As a result, in some cases, the shard pruning process 140 may have additional flexibility in selecting shards for pruning.

Similarly, the shard pruning process 140 may select the pruning candidate in various ways. For example, the shard pruning process 140 may prioritize deleting non-identity shards over deleting identity shards. In some cases, when a pruning candidate availability zone stores only identity shards, the shard pruning process 140 may determine not to delete any shards at the pruning candidate availability zone, even if deleting a shard from the pruning candidate availability zone would not violate the durability model. In some cases, a different pruning candidate availability zone may instead be selected. In some embodiments, the shard spreading process 100 may determine whether the pruning candidate availability zone stores only identity shards before determining whether deleting a shard from the pruning candidate availability zone would violate the durability model. Is other embodiments, the shard spreading process 100 may determine whether the pruning candidate availability zone stores only identity shards after determining whether deleting a shard from the pruning candidate availability zone would violate the durability model. The shard spreading process 100 may subsequently spread the identity shards from the pruning candidate availability zone to other availability zones.

Figure 2:
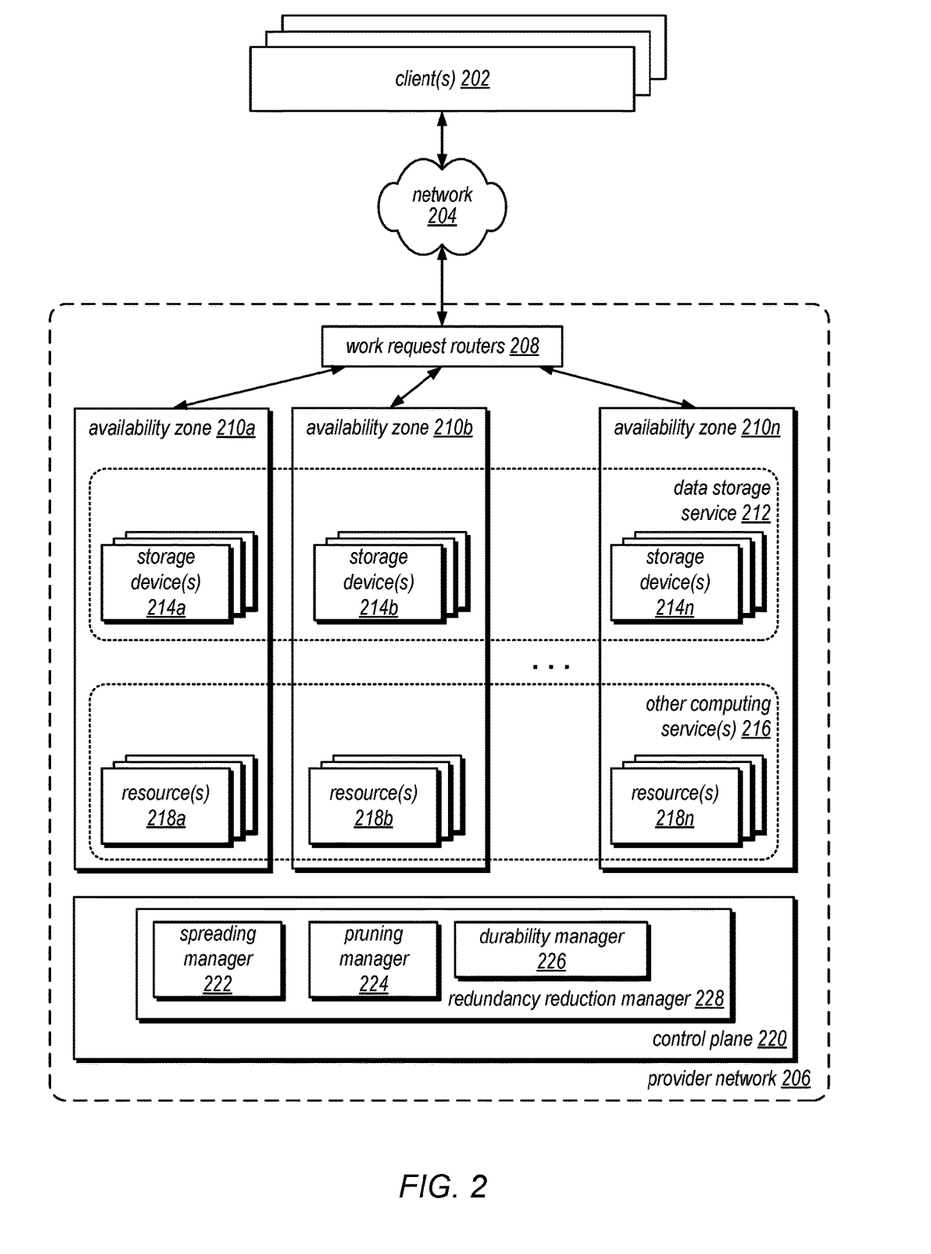
FIG. 2 is a block diagram illustrating a network-based service system architecture that may be configured to spread and prune shards of a data object stored at various availability zones.

FIG. 2 is a block diagram illustrating a network-based service system architecture that spreads and prunes shards of a data object stored at various availability zones, according to some embodiments. The network-based system includes a plurality of clients 202 that can interact with a provider network 206 via a network 204. The provider network 206 includes work request routers 208, a plurality of availability zones 210*a-n*, and a control plane 220. The plurality of availability zones 210*a-n* include hardware, such as storage devices 214*a-n* and resources 218*a-n*, that can be used to implement various services of the provider network 206, including a data storage service 212 and other computing services 216. The control plane includes a redundancy reduction manager 228. The redundancy reduction manager 228 includes a spreading manager 222 (e.g., a shard spreading manager), a pruning manager 224 (e.g., a shard pruning manager), and a durability manager 226. In some embodiments, at least some of the availability zones 210*a-n* correspond to the availability zones 102, 104, 106, and 108 of FIG. 1. In some embodiments, the storage devices 214*a-n* store the shards 110-139. In some embodiments, the spreading manager 222 is configured to implement the spreading process 100. In some embodiments, the pruning manager 224 is configured to implement the shard pruning process 140.

Provider network 206 may be set up by an entity such as a company or a public sector organization to provide one or more services (such as various types of cloud-based storage or computing services) accessible via the Internet and/or other networks (e.g., collectively corresponding to network 204) to clients 202. Provider network 206 may include numerous data centers hosting various resource pools, such as collections of physical and/or virtualized computer servers, storage devices, networking equipment, etc. used to implement and distribute the infrastructure and services offered by the provider network 206. In various embodiments, provider network 206 may include numerous availability zones 210, which may be implemented as fault tolerant zones for hosting and or providing services as part of provider network 206. Operation of a particular availably zone may continue irrespective of an infrastructure failure of another availability zone. In some embodiments, provider network 206 may store data objects as part of data storage service 212. These data objects may be stored as respective pluralities of shards at various storage devices 214. The storage devices 214 may be hardware servers or other electronic devices configured to store data. Additionally, the provider network 206 may provide other computing service (s) 216, which may include various storage, processing, networking or any other computing services to the clients 202.

Different availability zones 210 may be configured to host different storage devices 214. For example availability zone 210a hosts storage devices 214a, availability zone 210b hosts storage devices 214b, and availability zone 210n hosts storage devices 214n. Multiple storage devices may be respectively located in individual availability zones 210 may store each multiple shards of a data object, in some embodiments.

In various embodiments, other computing services 216 (e.g., virtual computing services, streaming services, other data storage services, etc.) may provide resources 218 in similar ways. For instance, resources 218a may be located in availability zone 210a, resource(s) 218b may be located in availability zone 210b and resources 218n may be located in availability zone 210n. Various compute nodes, servers, systems, or devices may be located in respective availability zones 210 and may implement or host the resources 218. Although the data storage service 212 and the other computing services 216 are illustrated separately, various resources may be used in common. For example, the data storage service 212 may, in some cases, use the resources 218a. Similarly, the other computing services 216 may store data at the storage devices 214a.

In various embodiments, provider network 206 may also implement a control plane 220. The control plane 220 may perform various functions with regard to storage of data at the storage devices 214a. For example, in the illustrated embodiment, the control plane 220 implements a redundancy reduction manager 228 configured, via the spreading manager 222, to perform a shard spreading process. Additionally, in the illustrated embodiment, the redundancy reduction manager 228 is configured, via the pruning manager 224, to perform a shard pruning process. Further, the redundancy reduction manager 228 is configured, using the durability manager 226, to maintain durability models for various data objects stored by the provider network 206 and to determine whether various actions (e.g., deleting various shards) would violate associated durability models. In other embodiments, the redundancy reduction manager 228 is implemented elsewhere in the provider network 206, such as by a single availability zone or by multiple availability zones (e.g., implementing the spreading manager at availability zone 210a and the pruning manager at availability zone 210b).

In addition to managing the shard spreading process and the shard pruning process, in some embodiments, the redundancy reduction manager 228 may control how the spreading manager 222 and the pruning manager 224 interact with each other and other portions of the provider network 206. In particular, in some embodiments, the spreading manager 222 and the pruning manager 224 may synchronize the shard spreading process with the shard pruning process. In other embodiments, the shard spreading process may not be synchronized with the shard pruning process. Additionally, in some embodiments, as a way of preventing the shard spreading process (e.g., for multiple data objects) from consuming too many resources of the provider network 206 in a small amount of time (e.g., because a new availability zone is now online and shards of many data objects can be moved to storage devices of the new availability zone), the redundancy reduction manager 228, the spreading manager 222, or both may meter the shard spreading process such that only a particular number of shards may be spread within a particular amount of time. In other words, the redundancy reduction manager 228, the spreading manager 222, or both may ensure that no more than a threshold number of shards (e.g., of the provider network 206 in aggregate or of the particular data object) are moved within a particular amount of time. Similarly, as a way of preventing the shard pruning process (e.g., for multiple data objects) from consuming too many resources of the provider network 206 in a small amount of time (e.g., because many shards were just moved), the redundancy reduction manager 228, the pruning manager 224, or both may meter the shard pruning process such that only a particular number of shards may be deleted within a particular amount of time. In other words, the redundancy reduction manager 228, the pruning manager 224, or both may ensure that no more than a threshold number of shards (e.g., of the provider network 206 in aggregate or of the particular data object) are deleted within a particular amount of time.

The control plane 220 may also provide and/or perform various administrative functions and tasks for data storage service 212 and other computing service(s) 216. For example, control plane 220 may implement various client management features. For example, control plane 220 may coordinate the metering and accounting of client usage of network-based services, including computing resources, such as by tracking the identities of requesting clients 202, the number and/or frequency of client requests, the types and times storage devices 214 are utilized, size of data stored or retrieved on behalf of clients 202, overall storage bandwidth used by clients 202 or any other measurable client usage parameter. Control plane 220 may also implement financial accounting and billing systems, or may maintain a database of usage data that may be queried and processed by external systems for reporting and billing of client usage activity. In certain embodiments, control plane 220 may be configured to collect, monitor and/or aggregate a variety of provider network operational metrics, such as metrics reflecting the rates and types of requests received from clients 202, bandwidth utilized by such requests, system processing latency for such requests, system component utilization (e.g., network bandwidth and/or utilization within the provider network and within specific availability zones), rates and types of errors, or any other suitable metrics. In some embodiments such metrics may be used by system administrators to tune and maintain system components, while in other embodiments such metrics (or relevant portions of such metrics) may be exposed to clients 202 to enable such clients to monitor their usage of data storage service 212, and/or other computing service(s) 216 (or the underlying systems that implement those services).

In some embodiments, control plane 220 may also implement user authentication and access control procedures. For example, for a given network-based services request to access a particular instance, control plane 220 may be configured to ascertain whether the client 202 associated with the request is authorized to access the particular instance. Control plane 220 may determine such authorization by, for example, evaluating an identity, password or other credential against credentials associated with the particular database, or evaluating the requested access to the particular instance against an access control list for the particular instance.

In some embodiments, provider network may include the hardware (e.g., modems, routers, switches, load balancers, proxy servers, etc.) and software (e.g., protocol stacks, accounting software, firewall/security software, etc.) necessary to establish a networking links between different components of provider network 206, such as storage devices 214a-n, components of control plane 220 as well as external networks 204 (e.g., the Internet). In some embodiments, this hardware includes work request routers 208, configured to facilitate communications between the clients 202 and various portions of the provider network 206.

Clients 202 may encompass any type of client configurable to submit requests to provider network 206. For example, a given client 202 may include a suitable version of a web browser, or may include a plug-in module or other type of code module configured to execute as an extension to or within an execution environment provided by a web browser. Alternatively, a client 202 may encompass an application such as a computing resource tool or application (or user interface thereof), a media application, an office application or any other application that may make use of data stored at storage devices 214 or resources 218 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture.

Clients 202 may convey network-based services requests to provider network 206 via network 204. In various embodiments, network 204 may encompass any suitable combination of networking hardware and protocols necessary to establish network-based communications between clients 202 and provider network 206. For example, a network 204 may generally encompass the various telecommunications networks and service providers that collectively implement the Internet. A network 204 may also include private networks such as local area networks (LANs) or wide area networks (WANs) as well as public or private wireless networks. For example, both a given client 202 and provider network 206 may be respectively provisioned within enterprises having their own internal networks. In such an embodiment, a network 204 may include the hardware (e.g., modems, routers, switches, load balancers, proxy servers, etc.) and software (e.g., protocol stacks, accounting software, firewall/security software, etc.) necessary to establish a networking link between given client 202 and the Internet as well as between the Internet and provider network 206. It is noted that in some embodiments, clients 202 may communicate with provider network 206 using a private network rather than the public Internet.

Figure 3:
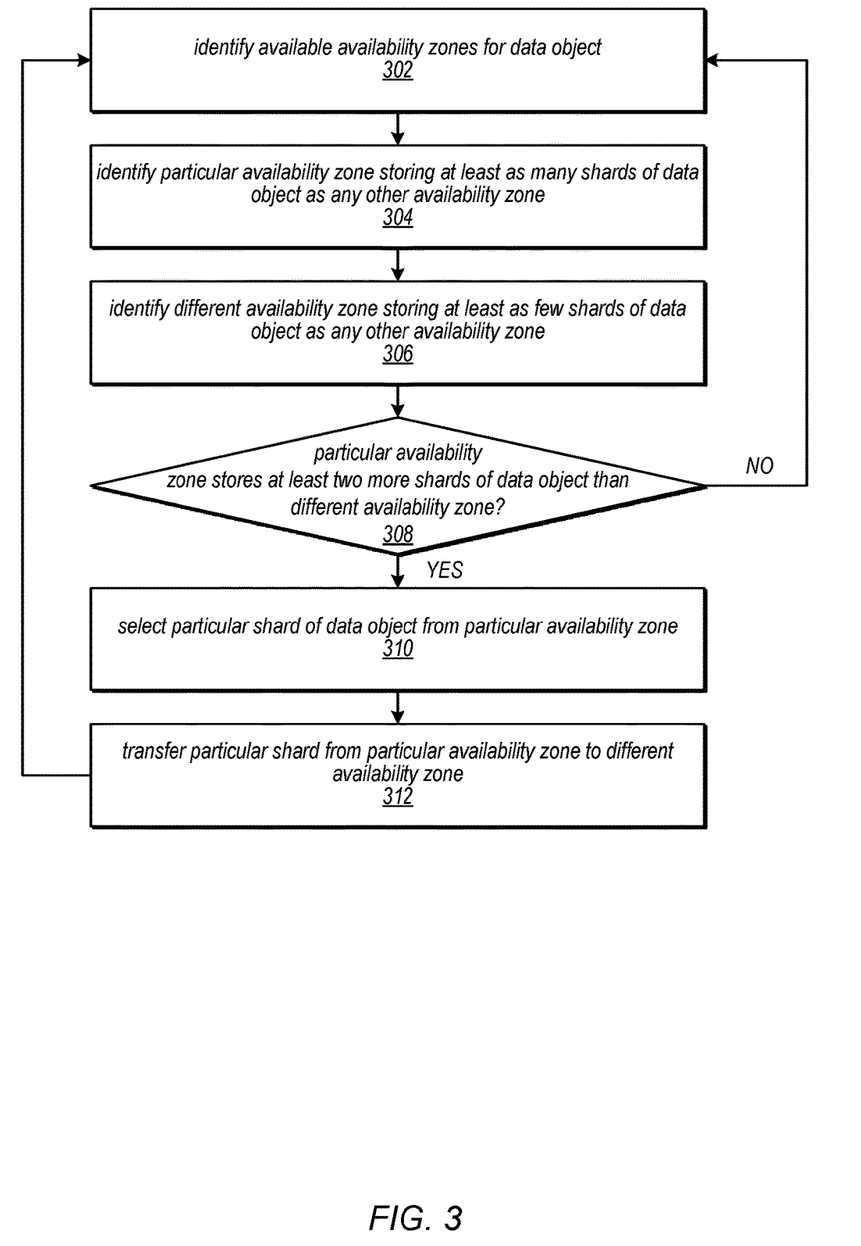
FIG. 3 is a flow diagram illustrating one embodiment of a method for spreading a shard of a data object.

As described above, in one example of a data storage service, shards of a data object may be spread between availability zones. Based on spreading the shards of the data object and subsequently performing a shard pruning process, network resources used by a particular data object may be reduced without violating a durability model for the particular data object. One embodiment of a method for spreading a shard of a data object is illustrated by the flow diagram of FIG. 3. Although FIG. 3 illustrates operations being performed in a particular order, in other embodiments, some operations may be performed in other orders or in parallel.

As illustrated at 302, in this example, the method may include identifying available availability zones for a data object. For example, the spreading manager 222 may identify that a data object can store shards at availability zones 102, 104, 106, and 108. In some embodiments, identifying the available availability zones occurs periodically. Additionally or alternatively, identifying the available availability zones may occur in response to the system detecting a new available availability zone for the data object. As illustrated at 304, in this example, the method may include identifying a particular availability zone storing at least as many shards of the data object as any other availability zone. For example, the spreading manager 222 may identify the availability zone 102 as the particular availability zone.

As illustrated in 306, in this example, the method may include identifying a different availability zone storing at least as few shards of the data object as any other availability zone. For example, the spreading manager may identify the availability zone 108 as the different availability zone. In some cases, the different availability zone may not store any shards of the data object. In other cases, the different availability zone may store at least some shards of the data object. As illustrated at 308, in this example, the method may include determining whether the particular availability zone stores at least two more shards of the data object than the different availability zone. In response to the particular availability zone not storing at least two more shards of the data object than the different availability zone, the method may return to 302.

As illustrated at 310, in this example, the method may include in response to the particular availability zone not storing at least two more shards of the data object than the different availability zone, selecting a particular shard of the data object from the particular availability zone. For example, in response to the spreading manager 222 determining that the availability zone 102 stores six more shards of the data object than the availability zone 108, the spreading manager 222 may select the shard 118. In some cases, the method may include selecting more than one shard. The shard may be selected using various methods, such as whether the shard is an identity shard. As illustrated at 312, in this example, the method may include transferring the particular shard from the particular availability zone to the different availability zone. For example, the spreading manager 222 may transfer the shard 118 from the availability zone 102 to the availability zone 108. After transferring the shard, the method may return to 302. Thus, the method of FIG. 3 may enable spreading a shard of a data object.

In some embodiments, when multiple availability zones each store at least as many shards of the data object as any other availability zone, additional criteria may be used to identify the availability zone storing at least as many shards of the data object as any other availability zone. For example, the spreading manager 222, may identify an availability zone of the multiple availability zones having a shortest network distance to the different availability zone. Alternatively, the availability zone may be identified based on additional information such as the durability model and where identity shards of the data object are stored.

In other embodiments, an availability zone that does not store the most shards of the data object may transfer shards to the different availability zone. Similarly, in some embodiments, the availability zone that receives the particular shard may not be the availability zone that stores at least as few shards of the data object as any other availability zone.

Figure 4:
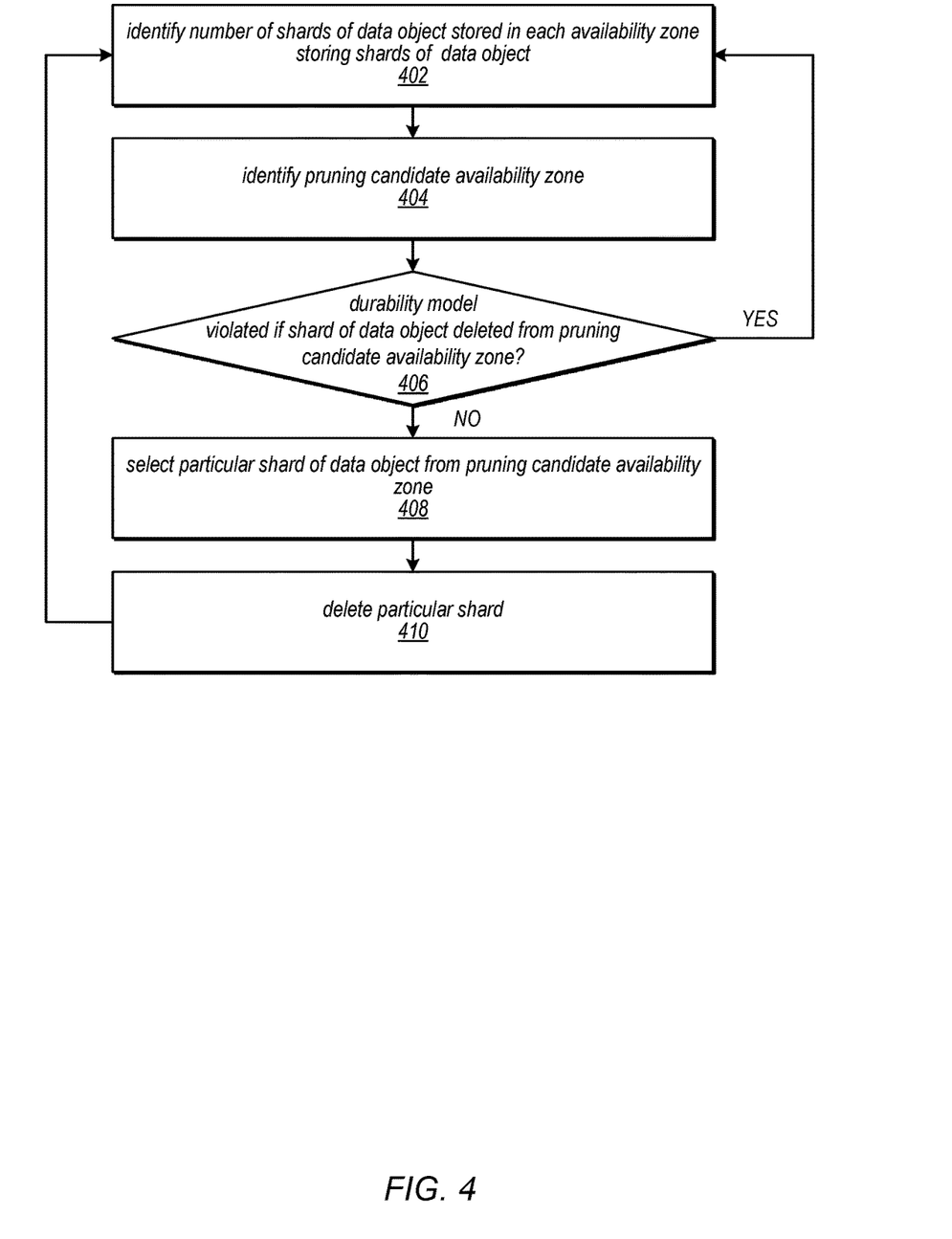
FIG. 4 is a flow diagram illustrating one embodiment of a method for pruning a shard of a data object.

As described above, in one example of a data storage service, shards of a data object may be pruned from availability zones. Based on pruning the shards of the data object and a shard spreading process, network resources used by a particular data object may be reduced without violating a durability model for the particular data object. One embodiment of a method for pruning a shard of a data object is illustrated by the flow diagram of FIG. 4. Although FIG. 4 illustrates operations being performed in a particular order, in other embodiments, some operations may be performed in other orders or in parallel.

As illustrated at 402, in this example, the method may include identifying a number of shards of a data object stored in each availability zone storing shards of the data object. For example, the pruning manager 224 may identify that the availability zone 102 stores 4 shards, the availability zone 104 stores 5 shards, the availability zone 106 stores 5 shards, and the availability zone 108 stores 4 shards. As illustrated at 404, in this example, the method may include identifying a pruning candidate availability zone. For example, the pruning manager 224 may identify the availability zone 104 as the pruning candidate availability zone. In some embodiments, an availability zone storing at least as many shards of the data object as any other availability zone may be selected as the pruning candidate availability zone. In other embodiments, other processes (e.g., round-robin, random selection, based on where identity shards of the data object are stored) may be used to identify the pruning candidate availability zone.

As illustrated at 406, in this example, the method may include determining whether the durability model would be violated if a shard of the data object were deleted from the pruning candidate availability zone. In some cases, additional information may also be used, such as a number (e.g., a quantity) of shards stored at the other availability zones. In some cases, determining whether deleting the shard would violate the durability model is based on a number of shards stored by an availability zone storing at least as many shards as any other availability zone other than the pruning candidate availability zone. If the durability model would be violated, the method returns to 402.

As illustrated at 408, in this example, the method may include, in response to determining that the durability model would not be violated, selecting a particular shard of the data object from the pruning candidate availability zone. For example, the pruning manager 224 may select the shard 128. In some embodiments, as described above, various criteria may be used for selecting the particular shard, such as whether the particular shard is an identity shard of the data object. As illustrated at 410, in this example, the method may include deleting the particular shard. For example, the pruning manager 224 may delete the shard 128. Thus, the method of FIG. 4 may enable pruning a shard of a data object.

Figure 5:
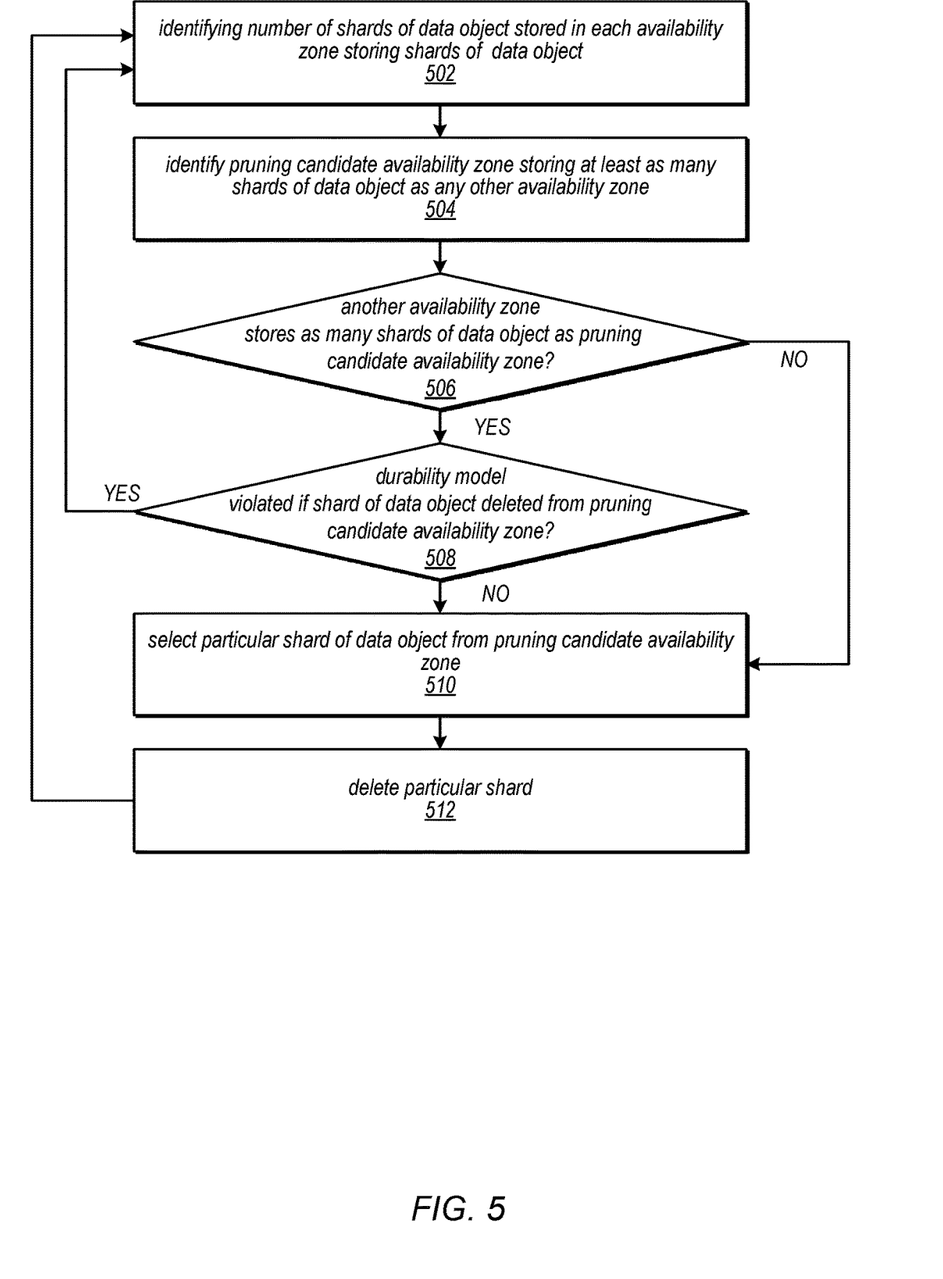
FIG. 5 is a flow diagram illustrating one embodiment of a method for pruning a shard of a data object.

As described above, in one example of a data storage service, shards of a data object may be pruned from availability zones. Based on pruning the shards of the data object and a shard spreading process, network resources used by a particular data object may be reduced without violating a durability model for the particular data object. One embodiment of a method for pruning a shard of a data object is illustrated by the flow diagram of FIG. 5. Although FIG. 5 illustrates operations being performed in a particular order, in other embodiments, some operations may be performed in other orders or in parallel. In the illustrated embodiment, the durability model specifies a redundancy requirement that accounts for at least one availability zone-wide failure.

As illustrated at 502, in this example, the method may include identifying a number of shards of a data object stored in each availability zone storing shards of the data object. For example, the pruning manager 224 may identify that the availability zone 102 stores 4 shards, the availability zone 104 stores 5 shards, the availability zone 106 stores 5 shards, and the availability zone 108 stores 4 shards. As illustrated at 504, in this example, the method may include identifying a pruning candidate availability zone storing at least as many shards of the data object as any other availability zone. For example, the pruning manager 224 may identify the availability zone 106 as the pruning candidate availability zone.

As illustrated at 506, in this example, the method may include determining whether another availability zone stores as many shards of the data object as the pruning candidate availability zone. If no other availability zone stores as many shards of the data object as the pruning candidate availability zone, the method may proceed to 510. As illustrated at 508, in this example, the method may include, in response to determining that at least one other availability zone stores as many shards of the data object as the pruning candidate availability zone, determining whether the durability model would be violated if a shard of the data object were deleted from the pruning candidate availability zone. In some cases, additional information may also be used, such as a number (e.g., a quantity) of shards stored at the other availability zones. If the durability model would be violated, the method returns to 502. In other words, in the illustrated embodiment, 508 may be bypassed if the pruning candidate availability zone stores the most shards of the data object.

As illustrated at 510, in this example, the method may include, in response to determining that the pruning candidate availability zone stores the most shards of the data object or to determining that the durability model would not be violated, selecting a particular shard of the data object from the pruning candidate availability zone 408. For example, the pruning manager 224 may select the shard 138. In some embodiments, as described above, various criteria may be used for selecting the particular shard, such as whether the particular shard is an identity shard of the data object. As illustrated at 512, in this example, the method may include deleting the particular shard. For example, the pruning manager 224 may delete the shard 138. Thus, the method of FIG. 5 may enable pruning a shard of a data object.

Figure 6:
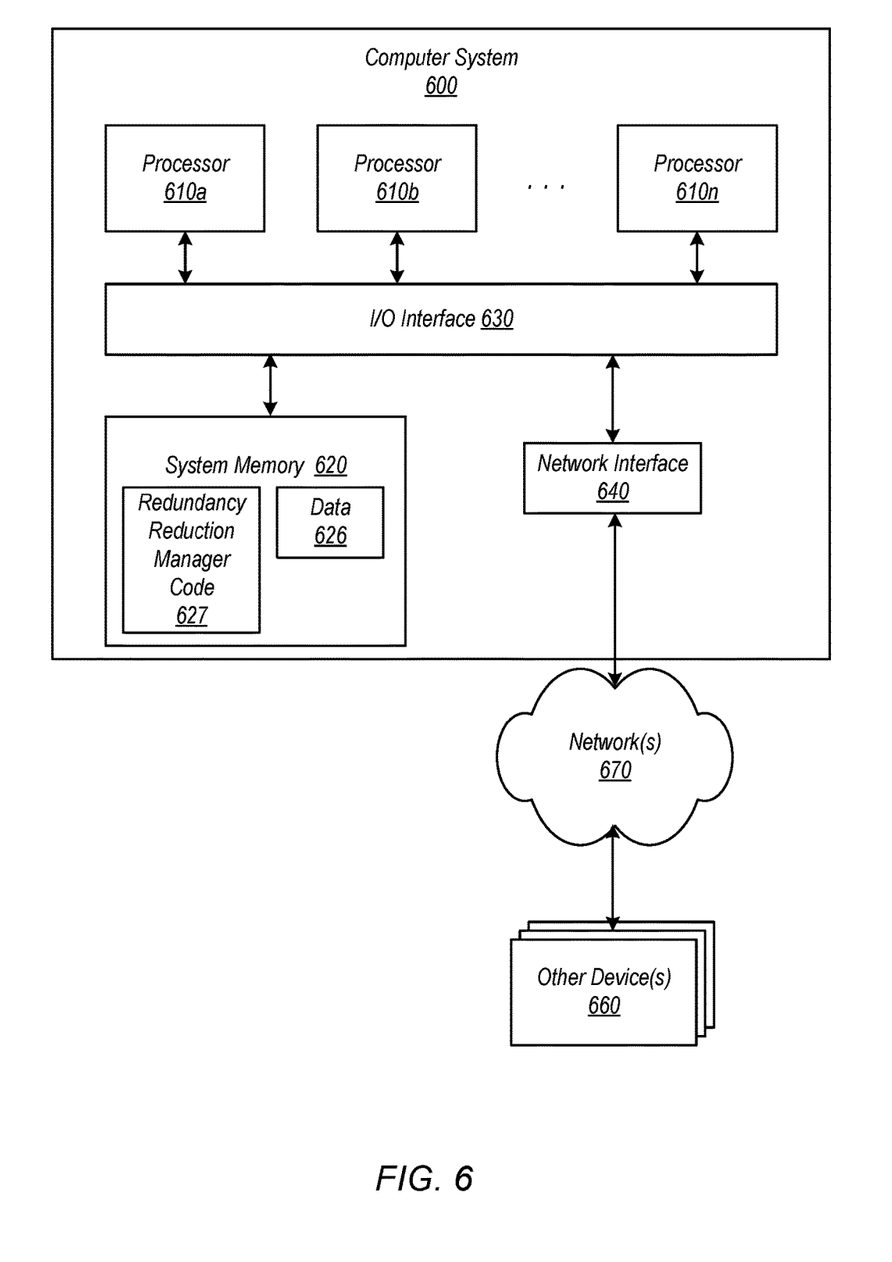
FIG. 6 is a block diagram illustrating one embodiment of a computer system configured to implement at least a portion of a system that manages storage of shards of data objects, as described herein.

One embodiment of a computer system configured to implement at least a computer system configured to implement at least a portion of a system that manages storage of shards of data objects as described above with reference to FIGS. 1-5 is shown in FIG. 6. In at least some embodiments, a server that implements a portion or all of the methods and apparatus for a data storage management system as described herein may include a general-purpose computer system that includes or is configured to access one or more computer-accessible media, such as a computer system 600 illustrated in FIG. 6. In the illustrated embodiment, the computer system 600 includes one or more processors 610*a-n* coupled to a system memory 620 via an input/output (I/O) interface 630. The computer system 600 further includes a network interface 640 coupled to the I/O interface 630.

In various embodiments, the computer system 600 may be a uniprocessor system including one processor 610a, or a multiprocessor system including several processors 610a-n (e.g., two, four, eight, or another suitable number). The processors 610a-n may be any suitable processors capable of executing instructions. For example, in various embodiments, the processors 610a-n may be general-purpose or embedded processors implementing any of a variety of instruction set architectures (ISAs), such as the x86, PowerPC, SPARC, or MIPS ISAs, or any other suitable ISA. In multiprocessor systems, each of the processors 610a-n may commonly, but not necessarily, implement the same ISA.

System memory 620 may be configured to store instructions and data accessible by the processor(s) 610. In various embodiments, the system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for implementing a data storage management system, are shown stored within the system memory 620 as redundancy reduction manager code 627 and data 626. For example, the redundancy reduction manager code 627 may, when executed by a processor, cause the processor to implement at least a portion of functions of the redundancy reduction manager 228, the spreading manager 222, the pruning manager 224, the durability manager 226, or any combination thereof.

In one embodiment, the I/O interface 630 may be configured to coordinate I/O traffic between a processor 610, the system memory 620, and any peripheral devices in the device, including the network interface 640 or other peripheral interfaces. In some embodiments, the I/O interface 630 may perform any necessary protocol, timing or other data transformations to convert data signals from one component (e.g., the system memory 620) into a format suitable for use by another component (e.g., a processor 610). In some embodiments, the I/O interface 630 may include support for devices attached through various types of peripheral buses, such as a variant of the Peripheral Component Interconnect (PCI) bus standard or the Universal Serial Bus (USB) standard, for example. In some embodiments, the function of the I/O interface 630 may be split into two or more separate components, such as a north bridge and a south bridge, for example. Also, in some embodiments some or all of the functionality of the I/O interface 630, such as an interface to the system memory 620, may be incorporated directly into a processor 610.

The network interface 640 may be configured to allow data to be exchanged between the computer system 600 and other devices 660 attached to a network or networks 670, such as other computer systems or devices as illustrated or described in FIGS. 1 through 5, for example. In various embodiments, the network interface 640 may support communication via any suitable wired or wireless general data networks, such as types of Ethernet network, for example. Additionally, the network interface 640 may support communication via telecommunications/telephony networks such as analog voice networks or digital fiber communications networks, via storage area networks such as Fibre Channel SANs, or via any other suitable type of network and/or protocol.

In some embodiments, the system memory 620 may be one embodiment of a computer-accessible medium configured to store program instructions and data as described above for FIGS. 1 through 5 for implementing embodiments of a data storage management system. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to the computer system 600 via the I/O interface 630. A non-transitory computer-accessible storage medium may also include any volatile or non-volatile media such as RAM (e.g. SDRAM, DDR SDRAM, RDRAM, SRAM, etc.), ROM, etc., that may be included in some embodiments of the computer system 600 as the system memory 620 or another type of memory. Further, a computer-accessible medium may include transmission media or signals such as electrical, electromagnetic, or digital signals, conveyed via a communication medium such as a network and/or a wireless link, such as may be implemented via the network interface 640.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a storage system comprising a plurality of storage devices located in a plurality of availability zones, wherein the storage system is configured to store a plurality of data objects according to a redundancy encoding technique, and wherein each respective data object of the plurality of data objects is stored as a respective plurality of shards such that the respective data object can be reconstructed from a particular number of shards that is fewer than a total number of shards for that data object; and
a redundancy reduction manager implemented by one or more hardware processors and configured to:
perform a shard spreading process for a particular data object, wherein, to perform the shard spreading process, the redundancy reduction manager is configured to:
identify an underutilized availability zone that stores at least two fewer shards of the particular data object than a different availability zone of the plurality of availability zones; and in response to identifying the underutilized availability zone, move at least one shard of the particular data object from a storage device of the different availability zone to a storage device of the underutilized availability zone; and perform a shard pruning process for the particular data object, wherein, to perform the shard pruning process, the redundancy reduction manager is configured to:

identify a number of respective shards of the particular data object stored at each of the plurality of availability zones;

identify a pruning candidate availability zone from the plurality of availability zones;

determine, based on a durability model for the particular data object and a number of shards of the particular data object stored by an availability zone storing at least as many of the respective shards as any other availability zone, whether deleting a shard of the particular data object from the pruning candidate availability zone would violate the durability model; and in response to determining that deleting the shard of the pruning candidate availability zone would not violate the durability model, delete a particular shard from the pruning candidate availability zone.

2. The system of claim 1, wherein the particular data object is encoded into the respective plurality shards according to a particular redundancy encoding technique, and wherein the shard spreading process and the shard pruning process are performed without re-encoding the particular data object into a different number of shards.

3. The system of claim 1, wherein each storage device of a plurality of particular storage devices of the plurality of storage devices in a particular availability zone of the plurality of availability zones share infrastructure, and wherein the plurality of particular storage devices have an infrastructure independence from a different availability zone such that a failure of the infrastructure of the different availability zone does not cause the plurality of particular storage devices to fail.

4. The system of claim 1, wherein the redundancy reduction manager is configured to synchronize the shard spreading process with the shard pruning process.

5. The system of claim 1, wherein, to perform the shard pruning process, the redundancy reduction manager is configured to, in response to determining that the pruning candidate availability zone stores more shards of the particular data object than any other availability zone of the storage system, delete a particular shard of the pruning candidate availability zone.

6. A method, comprising:
performing, by a shard pruning manager implemented by one or more computing devices associated with a network-based storage system that stores a particular data object at a plurality of availability zones as a plurality of shards such that the particular data object can be reconstructed from a particular number of shards that is fewer than a total number of shards for the particular data object:

identifying a number of respective shards of the particular data object stored at each of the plurality of availability zones;

identifying a particular pruning candidate availability zone from the plurality of availability zones;

determining, based on a durability model for the particular data object and the number of respective shards stored at each of the plurality of availability zones, whether deleting a shard of the particular data object from the particular pruning candidate availability zone would violate the durability model; and in response to determining that deleting the shard of the particular pruning candidate availability zone would not violate the durability model, deleting a particular shard from the particular pruning candidate availability zone.

7. The method of claim 6, wherein the durability model specifies a redundancy requirement for the particular data object, and wherein the redundancy requirement accounts for an availability zone-wide failure.

8. The method of claim 6, wherein identifying the particular pruning candidate availability zone comprises identifying an availability zone of the plurality of availability zones storing at least as many of the respective shards as any other availability zone as the particular pruning candidate availability zone, and wherein determining whether deleting the shard of the particular data object would violate the durability model is further based on a number of shards of the particular data object stored by an availability zone storing at least as many of the respective shards as any other availability zone other than the particular pruning candidate availability zone.

9. The method of claim 6, further comprising identifying the particular shard to delete, wherein identifying the particular shard comprises determining that the particular shard is not an identity shard of the particular data object.

10. The method of claim 6, further comprising:
identifying a different pruning candidate availability zone from the plurality of availability zones; and
in response to determining that the different pruning candidate availability zone does not store non-identity shards of the particular data object, determining not to delete any shards of the particular data object from the different pruning candidate availability zone, even though deleting a shard of the particular data object from the different pruning candidate availability zone would not violate the durability model,
wherein the identifying the particular pruning candidate availability zone is performed based on determining not to delete the shard from the different pruning candidate availability zone.

11. The method of claim 6, wherein deleting the particular shard is performed based on determining that fewer than a threshold number of shards have been deleted within a particular number of time.

12. The method of claim 6, wherein the particular data object is encoded according to a particular redundancy encoding technique, and wherein the pruning manager is configured to identify the pruning candidate availability zone and delete the particular shard without re-encoding the particular data object.

13. A non-transitory, computer-readable storage medium storing program instructions that, when executed on one or more computers, cause the one or more computers to:
implement a shard spreading manager for a network-based storage system that stores a particular data object at a plurality of availability zones as a plurality of shards such that the particular data object can be reconstructed from a particular number of shards that is fewer than a total number of shards for the particular data object, wherein the shard spreading manager is configured to:

identify an underutilized availability zone of the plurality of availability zones, wherein the underutilized availability zone stores at least two fewer shards of a particular data object than a different availability zone of the plurality of availability zones; and in response to identifying the underutilized availability zone, move at least one shard of the particular data object from a storage device of the different availability zone to a storage device of the underutilized availability zone.

14. The non-transitory, computer-readable storage medium of claim 13, wherein to identify the different availability zone, the shard spreading manager is configured to identify the different availability zone as storing at least as many of shards of the particular data object as any other availability zone.

15. The non-transitory, computer-readable storage medium of claim 13, wherein the shard spreading manager is configured identify the underutilized availability zone in response to receiving an indication that a particular availability zone that does not include shards of the particular data object is available to store one or more shards of the particular data object, wherein the particular availability zone is identified as the underutilized availability zone.

16. The non-transitory, computer-readable storage medium of claim 13, wherein, to identify the different availability zone, the shard spreading manager is configured to determine that a network distance between the different availability zone and the underutilized availability zone is less than to another network distance between the underutilized availability zone and another availability zone of the plurality of availability zones, wherein the other availability zone stores at least two more shards of the particular data object than the underutilized availability zone.

17. The non-transitory, computer-readable storage medium of claim 13, wherein the shard spreading manager is further configured to identify the at least one shard as the at least one shard to move based on whether the at least one shard is an identity shard of the particular data object.

18. The non-transitory, computer-readable storage medium of claim 17, wherein the shard spreading manager is further configured to prioritize spreading identity shards of the particular data object over spreading non-identity shards of the particular data object.

19. The non-transitory, computer-readable storage medium of claim 13, wherein the shard spreading manager is further configured to ensure that no more than a threshold number of shards are moved within a particular amount of time.

20. The non-transitory, computer-readable storage medium of claim 13, wherein the particular data object is encoded according to a particular redundancy encoding technique, and wherein the shard spreading manager is configured to move the at least one shard without re-encoding the particular data object.

* * * * *